(12) United States Patent
Meynier et al.

(10) Patent No.: US 7,325,647 B2
(45) Date of Patent: Feb. 5, 2008

(54) MOBILE SYSTEM FOR SEISMIC EMISSION WITH FIXED COUPLING DEVICES, AND METHOD THEREFOR

(75) Inventors: Patrick Meynier, Chatou (FR); Axelle Baroni, Rueil Malmaison (FR)

(73) Assignees: Institut Francais du Petrole, Cedex (FR); Compagnie Generale de Geophysique, Massy Cedex (FR); Gaz de France-Service National, Paris (FR)

( * ) Notice: Subject to any disclaimer, the term of this patent is extended or adjusted under 35 U.S.C. 154(b) by 214 days.

(21) Appl. No.: 10/499,634

(22) PCT Filed: Dec. 12, 2002

(86) PCT No.: PCT/FR02/04331

§ 371 (c)(1),
(2), (4) Date: Jun. 21, 2004

(87) PCT Pub. No.: WO03/056361

PCT Pub. Date: Jul. 10, 2003

(65) Prior Publication Data

US 2005/0067215 A1    Mar. 31, 2005

(30) Foreign Application Priority Data

Dec. 21, 2001 (FR) .................................. 01 16652

(51) Int. Cl.
G01V 1/047 (2006.01)
G01V 1/20 (2006.01)
G01V 1/44 (2006.01)

(52) U.S. Cl. ...................... 181/108; 181/104; 181/112; 181/122

(58) Field of Classification Search ................ 181/104, 181/108, 112, 122; 367/173
See application file for complete search history.

(56) References Cited

U.S. PATENT DOCUMENTS

| 3,282,371 A | * | 11/1966 | Miller, Jr. .................... 181/106 |
| 3,504,756 A | | 4/1970 | Bodine |
| 4,850,449 A | * | 7/1989 | Cheung ...................... 181/101 |
| 4,986,350 A | * | 1/1991 | Czernichow ............... 166/65.1 |

(Continued)

OTHER PUBLICATIONS

Soil-Embedded Detector Mounts For Seismic Monitor, BLAIR, Geophysics, vol. 60, No. 1 Jan.-Feb. 1995) p. 120-133, Fig. 16.

*Primary Examiner*—Lincoln Donovan
*Assistant Examiner*—Jeremy Luks
(74) *Attorney, Agent, or Firm*—Antonelli, Terry, Stout & Kraus, LLP.

(57) ABSTRACT

Seismic emission system for use in an underground formation, using at least one seismic source movable successively in a plurality of prepared activation locations and method for implementing same.

The system comprises for example a plurality of coupling devices (1) including each for example two anchor elements (12, 9') tightly coupled with the formation (by cementing for example). These anchor elements are secured to the seismic source (V) such as a vibrator of any type or an impulsive source by transmission elements (10, 13). The seismic source is coupled with coupling device (1) by fast locking means (18, 19). Coupling devices (1) can be preinstalled at a plurality of prepared activation locations above the formation to be monitored. Seismic monitoring operations can be carried out by moving at least one seismic source successively between the different locations where coupling devices (1) are installed.

15 Claims, 1 Drawing Sheete

U.S. PATENT DOCUMENTS

| | | | |
|---|---|---|---|
| 5,005,665 A * | 4/1991 | Cheung | 181/101 |
| 5,115,880 A * | 5/1992 | Sallas et al. | 181/106 |
| 5,360,951 A * | 11/1994 | Turpening | 181/113 |
| 5,724,311 A * | 3/1998 | Laurent et al. | 367/57 |
| 6,182,012 B1 * | 1/2001 | Laurent et al. | 702/6 |

* cited by examiner

MOBILE SYSTEM FOR SEISMIC EMISSION WITH FIXED COUPLING DEVICES, AND METHOD THEREFOR

FIELD OF THE INVENTION

The present invention relates to a seismic emission system for use in an underground formation using a source movable successively between a plurality of prepared activation locations and a method for implementing the system.

Such a seismic emission system finds applications notably in the field of seismic operations where seismic images of an underground formation to be explored are formed from elastic waves picked up by suitable seismic receivers, these waves being reflected by the subsoil discontinuities in response to waves transmitted by a source such as an electromechanical vibrator.

The system according to the invention is more particularly useful in the context of long-term monitoring operations in an underground reservoir under development (a fluid storage reservoir for example or an oil reservoir), referred to as repetitive seismic surveys, where seismic images of the subsoil obtained at regular intervals are compared so as to detect changes that may have occurred therein as a result of its development. These are long-lasting operations because the variations to be observed are relatively slow.

BACKGROUND OF THE INVENTION

Seismic monitoring of an underground reservoir is generally carried out by coupling with the ground seismic sources and receivers in various combinations where the sources and/or the receivers are arranged at the surface or in the vicinity thereof, or in one or more wells through the explored formation. Series of seismic emission-reception cycles are carried out by changing each time the location of the seismic source in relation to the axis of the well where the receivers are installed, according to a technique referred to as walk-away technique, and by recording the arrivals at receivers R1 to Rn as a function of the propagation time t.

The seismic sources used are in most cases electromechanical vibrators: electrohydraulic, piezoelectric vibrators, etc. Piezoelectric type vibrators are for example described in patent FR-2,791,180 or in U.S. Pat. No. 5,360,951.

Monitoring of the evolution of reservoirs generally requires seismic monitoring operations at spaced-out intervals. In practice, the surface seismic equipment has to be reinstalled for each new seismic recording-session and the conditions of emission of the previous seismic operations are preferably reproduced.

A known method of monitoring a hydrocarbon reservoir or an underground fluid reservoir comprises using a monitoring system including receiving antennas formed by interconnecting seismic receivers, permanently installed respectively in shallow holes, with connection means to which cables linked to a seismic laboratory can be connected, and a vibrator truck that is moved in the field.

Using a mobile source such as a vibrator involves drawbacks, especially within the context of periodic monitoring of an underground storage reservoir. A movable source does not allow a sufficient reproducibility in time of the seismic waves emitted. It is very difficult to position the source exactly at the same points it occupied during the previous emission-reception cycles and, in the event that this point is exactly the same, to obtain exactly the same ground coupling coefficient. This represents a constraint for the (generally overloaded) site operator who has to facilitate its evolution, all the more so if the source used has to be triggered substantially in the same places as during the previous emission-reception cycles.

Patent FR-2,728,973 (U.S. Pat. No. 5,724,311) describes a method and a device intended for permanent seismic monitoring of an underground formation. In the context of regular long-term monitoring operations in an underground zone, a seismic emission-reception device is permanently installed on the development site so as to find each time stable operating conditions again: identical emission-reception locations, identical quality of coupling with the formation, etc. The device comprises a plurality of seismic sources (electromechanical vibrators for example) at fixed locations at the surface or buried at a shallow level, which are supplied and triggered by a central control and recording station. The seismic sources and the connection network can be buried or permanently installed at the surface, and associated with at least one array of receivers permanently coupled with the ground at the surface or with the wall of at least one well drilled through the underground zone. All these permanently installed sources whose coupling with the surrounding formations remains stable and this supply network, at least partly buried, whose surface coverage area is limited, allow to carry out a series of seismic monitoring operations under stable operating conditions, without any risk of incompatibility with the development site activities.

Patent FR-2,728,973 (U.S. Pat. No. 5,724,311) describes another seismic monitoring device intended for permanent monitoring of an underground formation by means of one or more emission-reception sets comprising each a source such as a vibrator and a receiving antenna consisting of a plurality of elastic wave receivers such as geophones and/or hydrophones lowered in a well and coupled with the formation. The seismic source is arranged in a cavity close to the location of the antenna or formed by widening the section of this well in its upper part. The receivers and the source are connected to an outside control and signal acquisition station. The operations allowing setting of these devices are relatively simple and the ground coverage area in the various wells is reduced, which facilitates their integration in reservoir development sites.

By means of these permanently installed sources easy to integrate in reservoir development sites or fluid storage sites, and whose coupling quality with the surrounding formations is known and stable, a series of seismic monitoring operations can be carried out under similar operating conditions. The seismic trace sets can be usefully compared and their differences reflect the changes occurred in the formations, and not disturbances linked with climatic variations for example.

However, monitoring operations require permanent coupling of an often large number of seismic sources, which makes the monitoring installation relatively expensive.

SUMMARY OF THE INVENTION

The seismic emission system according to the invention allows emission of seismic waves in an underground formation at a plurality of prepared activation locations, under excellent reproducibility conditions.

It is characterized in that it comprises, at each location, a coupling device including at least one anchor element tightly coupled with the formation at a certain depth and at least one transmission element secured to the anchor element, and at least one seismic source movable successively between these various locations and provided with fast locking means for connection to the transmission element.

According to a first embodiment, the device intended for coupling with the formation comprises for example at least two anchor elements buried in the ground (at different depths for example), each one being connected by the transmission elements to the seismic source located at the surface or in the vicinity thereof.

The coupling device comprises for example a first transmission element associated with the anchor element which is the closest to the surface, and a second transmission element, the first transmission element surrounding the second transmission element and being associated at a first end with the second anchor element having the greatest depth of burial, the seismic source being tightly connected to the two transmission elements during operation.

The first transmission element is tubular for example, the seismic source resting on its opposite end by means of a seat.

According to a second embodiment, the device intended for coupling with the formation comprises an anchor element buried at a certain depth, the seismic source being coupled during operation with the transmission element secured to this anchor element, and resting on the ground directly or by means of support elements.

The system can comprise at least one casing insulating the transmission elements from the formation.

The locking elements are for example accessible in a pit provided in the ground at each location, in which the seismic source is placed during operation, the bearing surface on which the seismic source rests being either inside or outside the pit.

According to an embodiment, the seismic source is a vibrator of piezoelectric, electromagnetic, electrohydraulic or magnetostrictive type.

If the seismic source is a piezoelectric vibrator, it comprises for example a motor between a plate resting on the ground and an opposite plate suited to be fastened to the transmission element during operation.

The seismic source can be included in a vehicle provided with operating means for setting and coupling it, or it can be transported by an independent vehicle.

According to an embodiment, the system also comprises at least one seismic source permanently installed at a location equipped with a coupling device.

The method for seismic prospecting or monitoring of an underground formation according to the invention comprises installing an array of seismic receivers and coupling them with the formation. It is characterized in that it comprises:

installing in the field, in a plurality of predetermined locations, at least one coupling device comprising at least one anchor element tightly coupled with the formation at a certain depth and at least one transmission element secured to the anchor element, moving at least one seismic source successively between these various locations and securing it to the transmission elements of the corresponding coupling device, and at each of said locations, triggering the seismic source and acquisition of the seismic data picked up by the seismic receivers in response to the seismic signals applied to the formation by the seismic source.

The method can also comprise installing at least one seismic source permanently at one of said predetermined locations equipped with a coupling device.

Permanent installation of the emission system initially amounts to operations of anchoring the coupling devices at the various emission locations considered. With a single easily movable seismic vibrator whose coupling with the formation at the successive locations is stable and reproducible on account of the anchor devices previously installed, it is possible to carry out complete seismic operations whereas before, as many vibrators as there are emission points were required: the system therefore constitutes an economically profitable alternative to conventional devices.

BRIEF DESCRIPTION OF THE FIGURES

Other features and advantages of the emission system and of the method according to the invention will be clear from reading the description hereafter of embodiments given by way of non limitative example, with reference to the accompanying drawings wherein.

DETAILED DESCRIPTION

The emission system comprises an array of coupling devices 1 preinstalled in the field at selected locations suited for monitoring of the underground formation.

Figure 1:
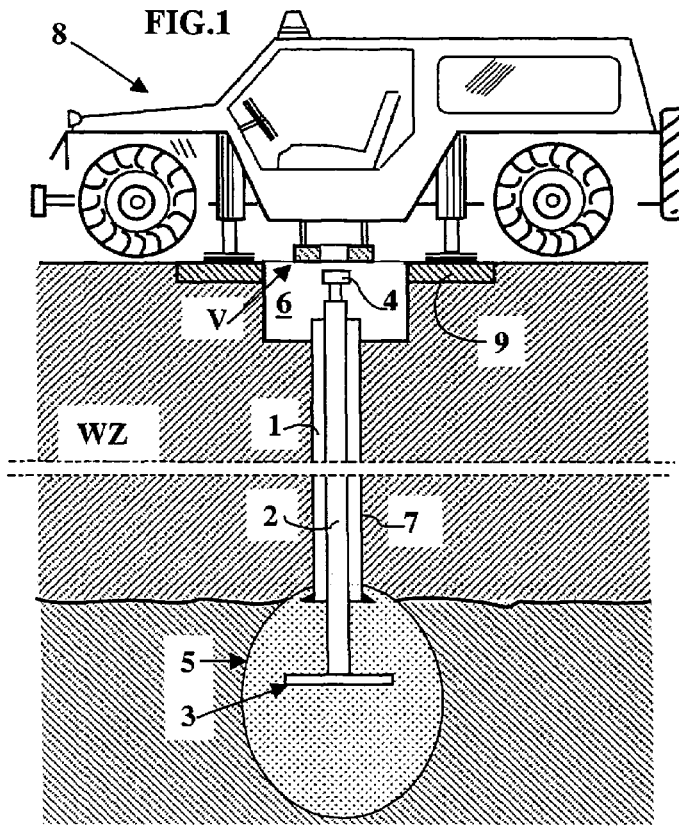
FIG. 1 diagrammatically shows a first embodiment of the coupling device.

According to the embodiment of FIG. 1, each coupling device 1 essentially comprises a transmission element 2 such as a rod or tendon, secured to a coupling element or horn 3 anchored in the ground, and provided with a locking head 4 allowing fast connection to a seismic source such as a vibrator V for example. Horn 3 is coupled with the formation at a certain depth, preferably below the weathered layer (WZ). A cavity 5 is created, into which the horn associated with its rod 2 is lowered, and horn 3 is cemented so as to couple it with the surrounding formation. Cavity 5 is connected to a pit 6 dug at the surface by a well provided with a casing 7. Vibrator V is lowered into pit 6 and connected to locking head 4 of rod 2. Vibrator V has a second supporting point on the ground in form of a fixed coupling baseplate 9 such as an annular plate arranged around pit 6.

Seismic vibrator V can be transported from one anchoring location to the next by an independent vehicle and placed in pit 6 in order to be coupled with device 1. It can also be integrated in a vehicle 8 provided with operating means (not shown) allowing to shift from an upper transport position to a lower working position. In this case, the vehicle rests on coupling baseplate 9. Vibrator V is then brought into the lower position and connected to locking head 4 of rod 2 of coupling device 1.

Figure 2:
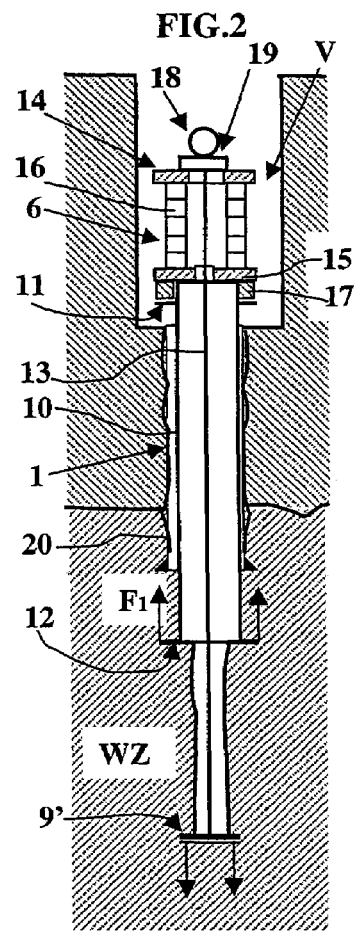
FIG. 2 diagrammatically shows a second embodiment of the coupling device.

According to the embodiment of FIG. 2, the device comprises two coupling elements such as plates 9', 12 buried at different depths (preferably below the weathered layer WZ). The seismic source rests by means of a coupling collar 11 on the upper part of a tubular transmission element 10 (referred to as tube hereafter). At the base thereof, it is fastened to upper coupling plate 12. Another transmission element 13 such as a rod or a cable, for example, secured to lower coupling plate 9 at a first end and connected by means of a fast locking head 18 to seismic source V at its opposite end, runs through tube 10. Seismic source V thus transmits the waves only by means of the two buried plates 9', 12 (and possibly of tube 10 and cable 13 if they are in contact with the formation). Tube 10 and cable 13 can also be uncoupled from the adjacent formations by a casing 20. The wellbore also opens into a pit 6 serving as a protection for fast locking head 18 and vibrator V.

Vibrator V can be of piezoelectric, electromagnetic, electrohydraulic or magnetostrictive type. A piezoelectric type vibrator comprises for example (FIG. 2) two plates 14, 15 between which several cylindrical piles 16 obtained by piling piezoelectric discs are inserted, or possibly a single pile made by piling annular piezoelectric elements. Lower plate 15 is provided with a tubular extension 17 suited to rest against collar 11 ending tube 10 in the upper part thereof. Plates 14, 15 are provided with a central opening allowing free passage of rod or cable 13. A fast connection means 19 of a well-known type is used to secure rod 13 (via locking head 18) to upper plate 14 of vibrator V.

Implementation

Figure 3:
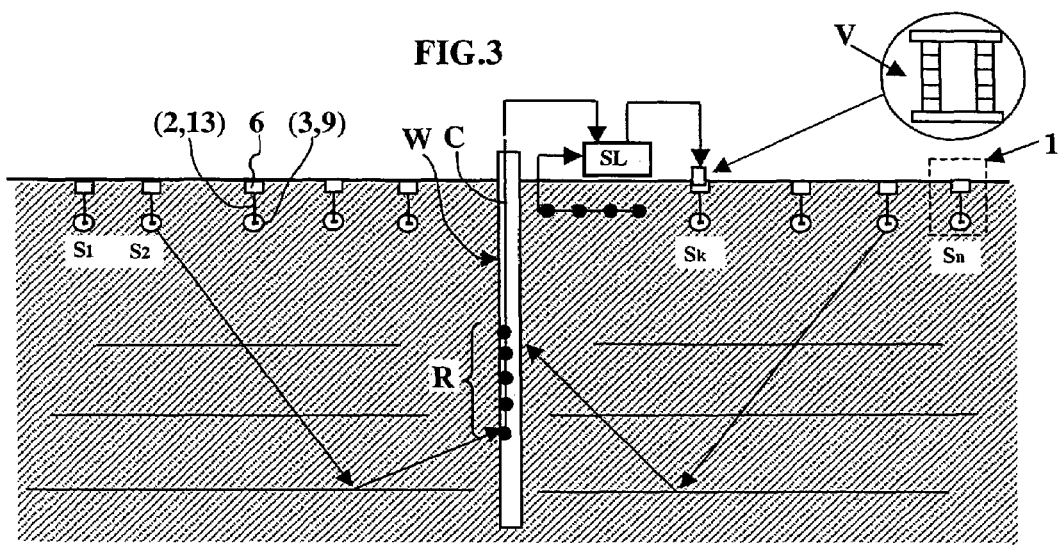
FIG. 3 diagrammatically shows an example of implementation of the emission system with anchoring of a vibrator movable successively between the prepared anchoring locations.

The device intended for seismic monitoring of an underground formation comprises (FIG. 3) an array of anchor devices 1 such as, for example, those described above, distributed in the field, and at least one array of seismic receivers R permanently installed in contact with the monitored zone. This array of receivers R can be installed in a well W, whether an exploration well or a development well for the monitored zone, outside a production tubing as described in patent FR-2,674,029 (U.S. Pat. No. 5,243,562) so as to keep it clear for other activities; it can also be buried in the ground near to the surface. The array of receivers R is connected to a central control and recording station SL by means of connection cables C.

Vibrator V is successively transported to the various locations of coupling devices 1, lowered into pit 6 and fastened to the anchor systems so as to be coupled with the formation by means of elements 3, 9, 9' and 12 described above. Once vibrator V secured to an anchor device 1, the seismic operations can be started by triggering the vibrator and recording the seismic signals received by receivers R in response to the waves emitted. It is then separated from the coupling device and transported to the location of another coupling device and so on.

Operations are facilitated by the presence of a vehicle such as the vehicle shown in FIG. 1, provided with operating elements for fastening vibrator V (integrated in the vehicle in this case) to the transmission elements in each pit 6.

Embodiments where the or each mobile seismic source used is a vibrator have been described. It is however clear that the vibrator can be replaced by any other type of seismic source, an impulsive source for example.

A method where the formation monitoring operations are carried out by means of one or more mobile sources that can be anchored at various locations provided with an anchor device 1 has also been described. It is however possible, without departing from the scope of the invention, to combine this movable emission system with a fixed emission device where one or more seismic sources are permanently installed at a certain number of locations equipped with an anchor device 1 as described above.

The invention claimed is:

1. A seismic exploration or monitoring system intended for periodic seismic monitoring of an underground formation, comprising seismic signal emission means anchorable in the formation by fastening anchor means tightly coupled with the formation at a certain depth and reception means for signals coming from the formation in response to the seismic signals emitted, characterized in that the anchor means comprise a plurality of coupling devices, each one being preinstalled at a location of a series of locations selected above the underground formation and the emission means comprise at least one mobile seismic source movable successively between these various locations and provided with locking means for securing the seismic source successively to the various coupling devices, wherein each coupling device comprises at least a first and a second anchor element buried in the ground at different depths each one being connected by transmission elements to the seismic source arranged at the surface or in the vicinity thereof, a first of the transmission elements being associated with the anchor element which is the closest to the surface, and a second of the transmission elements being associated at a first end with the anchor element having the greatest depth of burial, the first of the transmission elements surrounding the second of the transmission elements, and the seismic source being tightly connected, during operation, to the transmission elements.

2. A system as claimed in claim 1, characterized in that the first transmission element is tubular, the seismic source resting on its opposite end by means of a seat.

3. A system as claimed in claim 1, characterized in that the seismic source rests on the ground directly or by means of support elements.

4. A system as claimed in claim 1, characterized in that the transmission elements are insulated from the formation by at least one casing.

5. A system as claimed in claim 1, characterized in that the locking means are accessible in a pit provided in the ground at each location wherein the seismic source is placed during operation.

6. A system as claimed in claim 5, characterized in that the bearing surface on which the seismic source rests is inside or outside the pit.

7. A system as claimed in claim 1, characterized in that the seismic source is a vibrator of piezoelectric, electromagnetic, electrohydraulic or magnetostrictive type.

8. A system as claimed in claim 1, characterized in that seismic source is a vibrator comprising a motor between a plate resting on the ground and an opposite plate suited to be secured to a transmission element during operation.

9. A system as claimed in claim 1, characterized in that the seismic source is integrated in a vehicle provided with operating means for setting and coupling the source.

10. A system as claimed in claim 1, characterized in that the seismic source is transported by an independent vehicle.

11. A system as claimed in claim 1, characterized in that it comprises at least one seismic source permanently installed at a location equipped with a coupling device.

12. A method intended for periodic seismic exploration or monitoring of an underground formation, comprising installing an array of seismic receivers and coupling thereof with the formation, and anchoring a seismic source with the formation by fastening to anchor means tightly coupled with the formation at a certain depth, characterized in that it comprises:

installing in the field, at each location of a plurality of predetermined locations above the underground formation, at least one coupling device comprising at least one anchor element tightly coupled with the formation at a certain depth and at least one transmission element secured to the anchor element, moving at least one seismic source successively between these various locations and securing it to the transmission elements of the corresponding coupling device, and at each of said locations, triggering the seismic source and acquisition of the seismic data picked up by the seismic receivers in response to the seismic signals applied to the formation by seismic source.

13. A method as claimed in claim 12, characterized in that it comprises integrating said seismic source in a vehicle provided with operating means for setting, coupling and moving the source.

14. A method as claimed in claim 12, characterized in that it comprises moving the seismic source between the successive locations, taking the seismic source out of the vehicle and coupling it to the connection element of each coupling device.

15. A method as claimed in claim 12, characterized in that it comprises installing at least one seismic source permanently at one of said predetermined locations equipped with a coupling device.

* * * * *